US012724600B2

(12) United States Patent
Blanchard et al.

(10) Patent No.: US 12,724,600 B2
(45) Date of Patent: Sep. 1, 2026

(54) PROGRAM UPDATE METHOD, PROGRAM UPDATE SYSTEM AND MOBILE OBJECT

(71) Applicant: HONDA MOTOR CO., LTD., Tokyo (JP)

(72) Inventors: Austin Joseph Blanchard, Dublin, OH (US); Genta Inoue, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 300 days.

(21) Appl. No.: 18/586,436

(22) Filed: Feb. 24, 2024

(65) Prior Publication Data

US 2025/0272079 A1 Aug. 28, 2025

(51) Int. Cl.
*G06F 8/65* (2018.01)
*G08B 21/18* (2006.01)

(52) U.S. Cl.
CPC ............... *G06F 8/65* (2013.01); *G08B 21/18* (2013.01)

(58) Field of Classification Search
CPC .................................. G08B 21/18; G06F 8/65
See application file for complete search history.

(56) References Cited

U.S. PATENT DOCUMENTS

| | | | | |
|---|---|---|---|---|
| 9,575,743 | B1 | 2/2017 | Chun | |
| 10,607,565 | B2 | 3/2020 | Aoki | |
| 2013/0197712 | A1* | 8/2013 | Matsuura | G06F 11/3013 701/1 |
| 2014/0088827 | A1 | 3/2014 | Yashiro et al. | |
| 2020/0114927 | A1* | 4/2020 | Yokota | G06F 8/65 |
| 2022/0317994 | A1* | 10/2022 | Nagamitsu | B60R 16/0231 |
| 2022/0326934 | A1 | 10/2022 | Goto | |
| 2023/0005305 | A1* | 1/2023 | Sakurai | G06F 8/65 |
| 2023/0063433 | A1 | 3/2023 | Li et al. | |
| 2023/0138510 | A1 | 5/2023 | Shizuka et al. | |

FOREIGN PATENT DOCUMENTS

| | | | | |
|---|---|---|---|---|
| CN | 111038414 | A * | 4/2020 | G06F 8/65 |
| CN | 116513084 | A | 8/2023 | |
| DE | 102022106659 | A1 * | 10/2022 | G06F 8/65 |
| DE | 102023109500 | B4 * | 11/2024 | G06F 8/65 |
| JP | 9-11858 | A | 1/1997 | |
| JP | H09125771 | A * | 5/1997 | G07C 9/00309 |
| JP | 2004-346789 | A | 12/2004 | |
| JP | 2019-142470 | A | 8/2019 | |
| JP | 6573500 | B2 | 9/2019 | |
| JP | 2021-27695 | A | 2/2021 | |
| JP | 7198986 | B2 * | 1/2023 | H05K 13/0888 |
| KR | 10-2469911 | B1 | 11/2022 | |
| KR | 10-2023-0066915 | A | 5/2023 | |

* cited by examiner

*Primary Examiner* — Phillip H Nguyen
(74) *Attorney, Agent, or Firm* — WHDA, LLP

(57) ABSTRACT

A mobile object comprises an acquisition processor acquiring new program from an external apparatus via a network; a rewriting control processor performing a rewriting control of rewriting a program of an electronic control unit equipped with the mobile object, the rewriting being performed by using the acquired new program during drive of the mobile object is disabled; a storage compartment covered by a hood; and a battery stored in the storage compartment and configured to supply electrical power to the rewriting control processor and the electronic control unit. The rewriting control processor detects whether the hood is opened during performing the rewriting control, and when it is detected that the hood is opened during performing the rewriting control, provides a notice to a user.

17 Claims, 15 Drawing Sheets

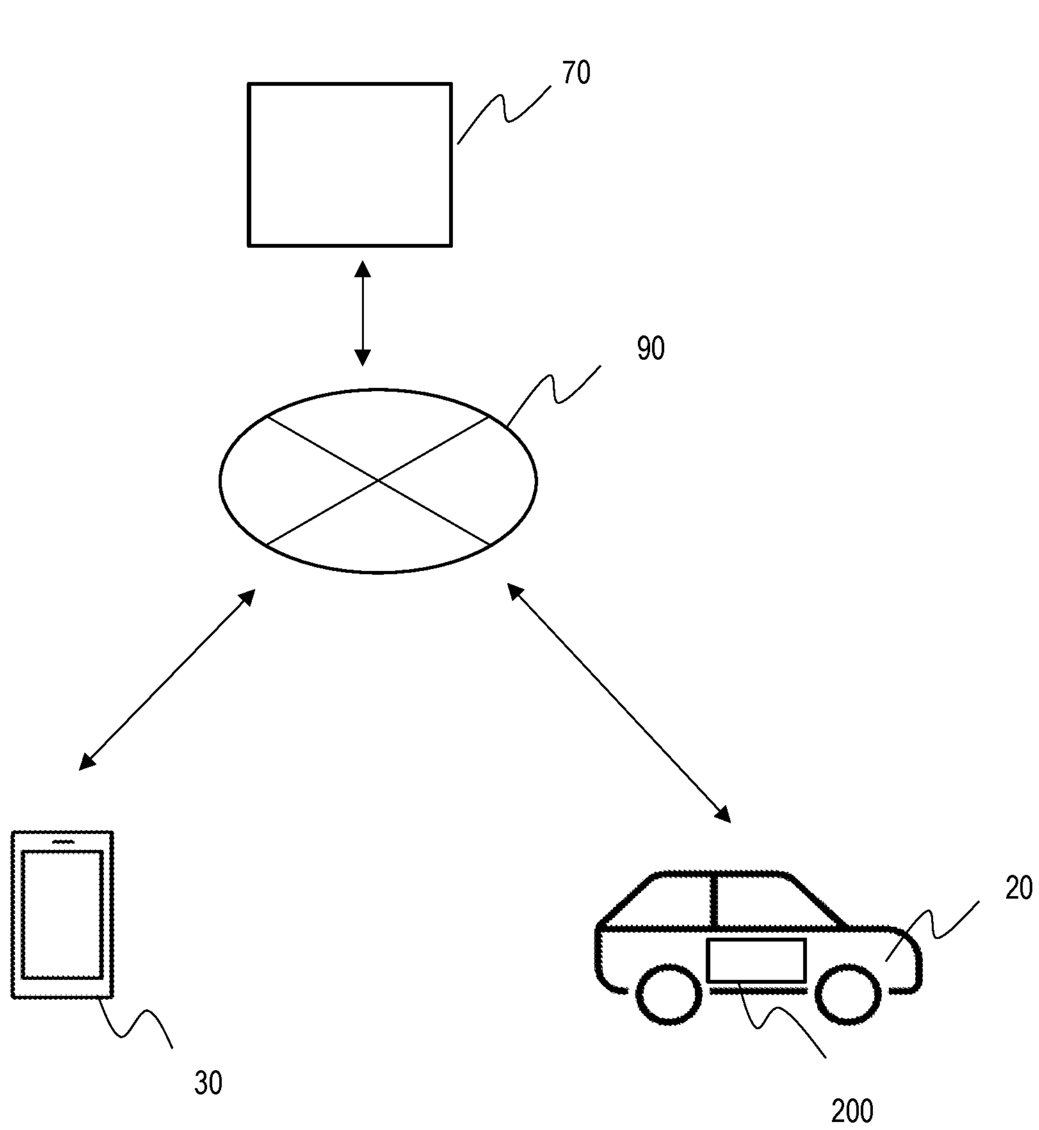
FIG.1

FIG. 5

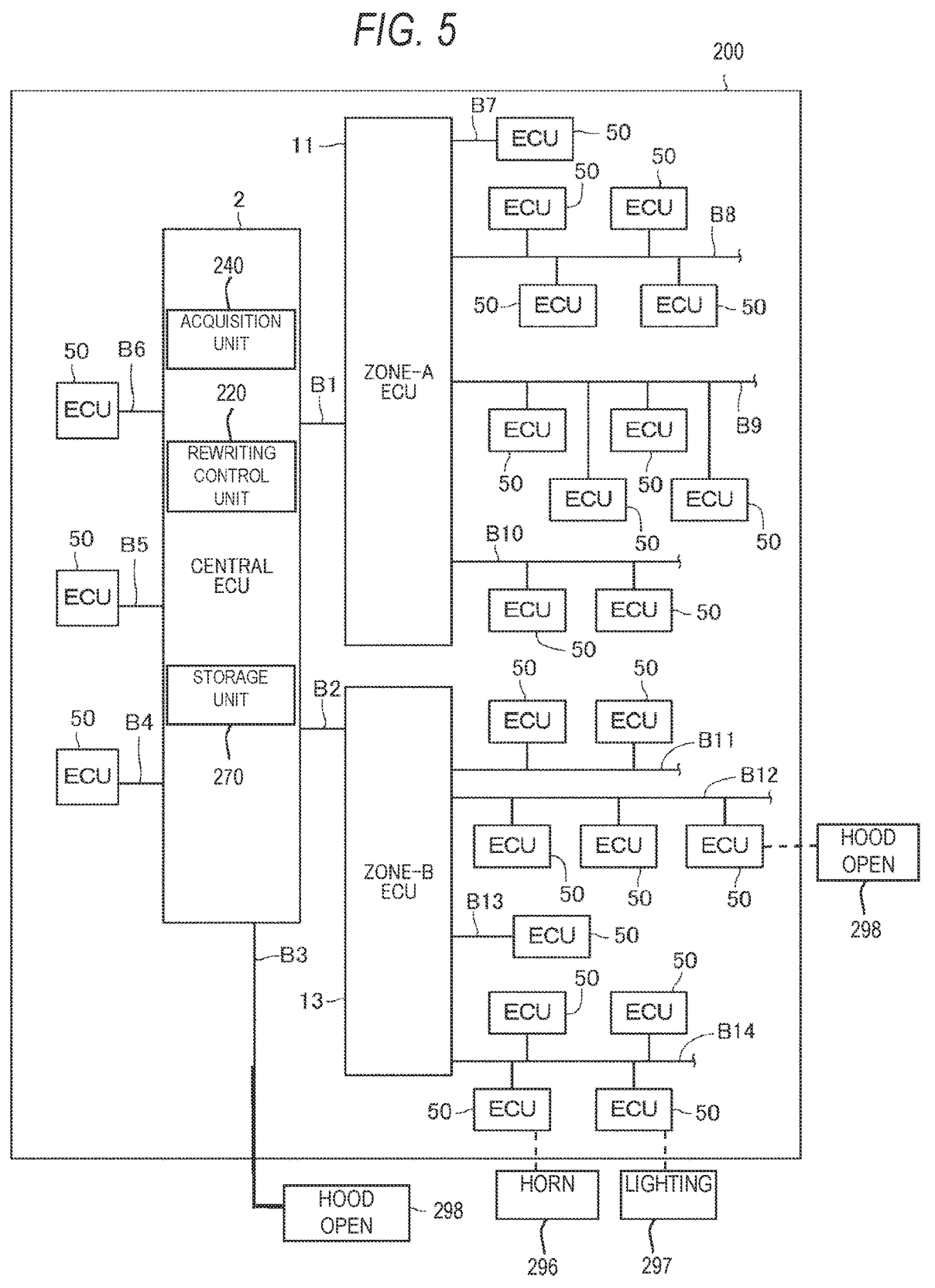

200
11
ZONE-A ECU
B7
ECU 50
B8
B9
B10
2
240
ACQUISITION UNIT
220
REWRITING CONTROL UNIT
CENTRAL ECU
STORAGE UNIT
270
B1
B2
B3
B4
B5
B6
ZONE-B ECU
13
B11
B12
B13
B14
HOOD OPEN
298
HORN
296
LIGHTING
297

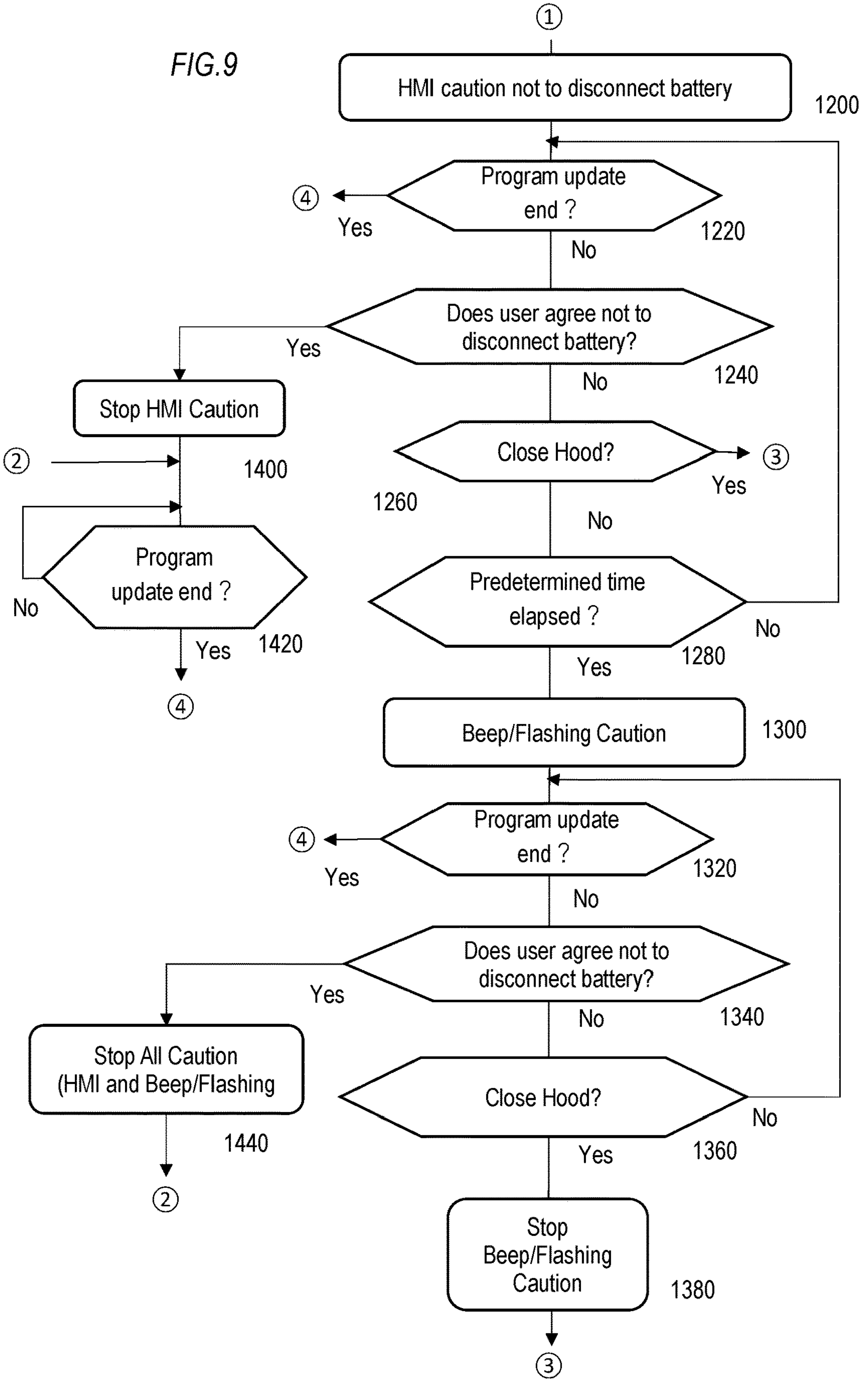

FIG.9
①
HMI caution not to disconnect battery
1200
Program update end ?
④
Yes
1220
No
Does user agree not to disconnect battery?
Yes
1240
No
Stop HMI Caution
②
1400
Close Hood?
③
Yes
1260
No
Program update end ?
No
Predetermined time elapsed ?
No
Yes
1420
1280
Yes
④
Beep/Flashing Caution
1300
Program update end ?
④
Yes
1320
No
Does user agree not to disconnect battery?
Yes
1340
No
Stop All Caution (HMI and Beep/Flashing
Close Hood?
No
1440
Yes
1360
②
Stop Beep/Flashing Caution
1380
③

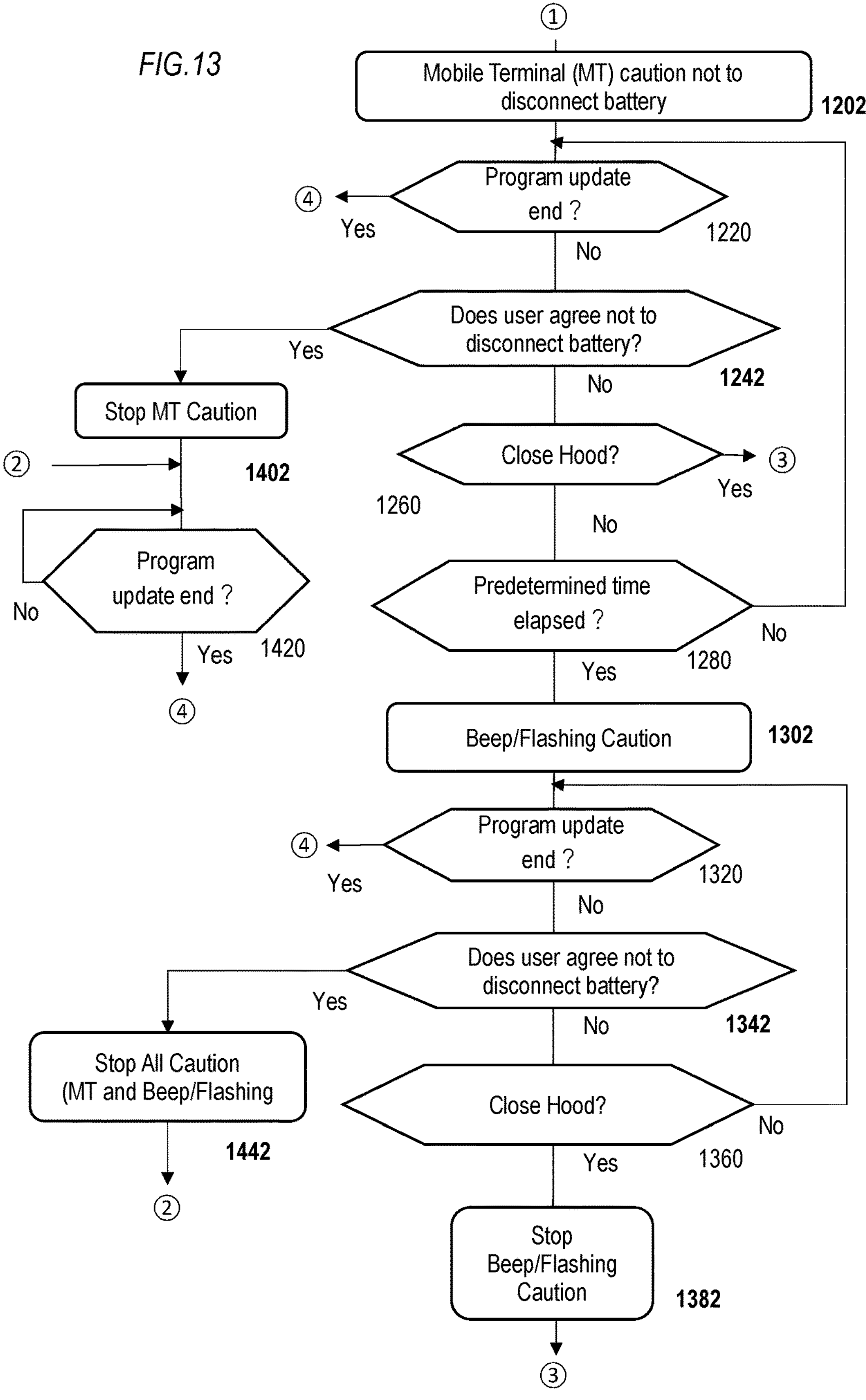
FIG.13
①
Mobile Terminal (MT) caution not to disconnect battery
1202
Program update end ?
④
Yes
1220
No
Does user agree not to disconnect battery?
Yes
No
1242
Stop MT Caution
②
1402
Close Hood?
③
Yes
1260
No
Program update end ?
No
Yes
1420
④
Predetermined time elapsed ?
No
1280
Yes
Beep/Flashing Caution
1302
Program update end ?
④
Yes
1320
No
Does user agree not to disconnect battery?
Yes
No
1342
Stop All Caution (MT and Beep/Flashing
Close Hood?
No
1442
Yes
1360
②
Stop Beep/Flashing Caution
1382
③

PROGRAM UPDATE METHOD, PROGRAM UPDATE SYSTEM AND MOBILE OBJECT

BACKGROUND

Technical Field

The present disclosure relates to a program update method, program update system and mobile object.

Related Art

An Electronic Control Unit (ECU) which is equipped with a mobile object such as a vehicle provides various functions implemented by executing a software program. The software program is updated by a program update system.

SUMMARY

In one aspect of the present disclosure, a computer implemented method updating a program of an electronic control unit equipped with a mobile object is provided. The mobile object comprises:

a rewriting control processor performing a rewriting control of rewriting a program of the electronic control unit;

a storage compartment covered by a hood; and a battery stored in the storage compartment and configured to supply electrical power to the rewriting control processor and the electronic control unit.

The method comprises:

acquiring new program from an external apparatus via a network; and performing the rewriting control of rewriting the program of the electronic control unit, the rewriting being performed by using the acquired new program during drive of the mobile object is disabled;

detecting whether the hood is opened during performing the rewriting control; and when it is detected that the hood is opened during performing the rewriting control, providing a notice to a user.

BRIEF DESCRIPTION OF THE DRAWINGS

The advantages of the disclosure will become apparent in the following description taken in conjunction with the following drawings.

FIG. 1 schematically describe an update system 10 according to one embodiment.

FIG. 5 schematically shows a system configuration provided to the control system 200.

FIG. 9 shows a processing of a program update method of a mobile object according to one embodiment of the present application.

FIG. 13 shows a processing of a program update method of a mobile object according to another embodiment of the present application.

DESCRIPTION OF EXEMPLARY EMBODIMENTS

Figure 2:
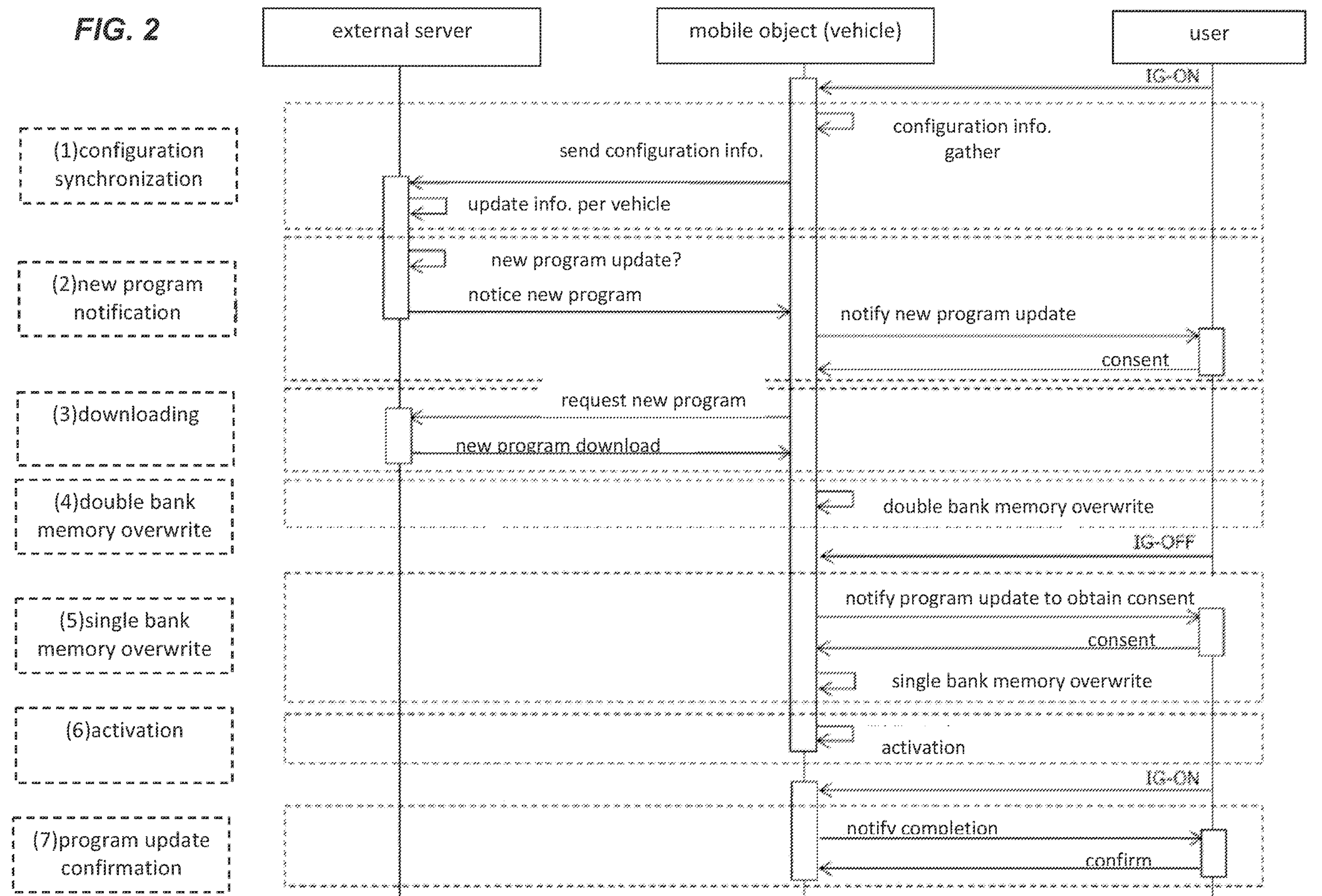
FIG. 2 schematically shows an example sequence of program update processing.

Hereinafter, the present disclosure will be described through embodiments, but the following embodiments do not limit the invention according to the claims. In addition, not all combinations of features described in the embodiments are essential to the solution of the invention. Hereinafter, like elements are described by using like reference numerals and repetitive description of like elements employed in one or more embodiments described herein is omitted.

FIG. 1 schematically shows an update system 10 according to one embodiment. The update system 10 includes a vehicle 20 and an external apparatus 70 such as a server device. The vehicle 20 includes a control system 200. The control system 200 is responsible for control of the vehicle 20 and communication with the external apparatus 70 via a communication network 90. The communication network 90 includes an IP network such as the Internet, a P2P network, a dedicated line including a VPN, a virtual network, a mobile communication network, and the like. A mobile terminal 30 may be also used for a user and connected to the communication network 90.

In the vehicle 20, the control system 200 includes a plurality of ECUs (Electronic Control Units) configured to perform control of the vehicle 20. The control system 200 is configured to acquire an update program of the ECU provided to the control system 200 from an outside. For example, the control system 200 is configured to receive an update program, which is transmitted from the external apparatus 70, via the communication network 90 by wireless communication. The control system 200 is configured to reprogram the ECU provided to the control system 200 by rewriting a program, which is executed by the ECU provided to the control system 200, with the update program. Such reprogramming is performed for upgrade and the like of functions of the ECU provided to the control system 200. In this way, the control system 200 is configured to update the ECU by reprogramming the ECU by OTA (Over The Air). In the present embodiment, rewriting a program, which is executed by a device such as the ECU, by the update program is referred to as 'program update'.

When performing the 'program update,' a user of the mobile object is asked to provide a consent. Such a consent from the user is obtained when downloading a new program from the external apparatus 70 and when executing the program update by using the downloaded new program.

Here, general flow of program update is described. FIG. 2 schematically shows an example sequence of program update processing. The flow of program update comprises seven steps: (1) configuration synchronization, (2) new program notification, (3) downloading, (4) double bank memory overwrite, (5) single bank memory overwrite, (6) activation, (7) program update confirmation.

In the (1) configuration synchronization, for example, the vehicle 20 gathers configuration information of the vehicle 20 and sends the information to the external apparatus such as a server 70. The server updates own information per vehicle by using the received configuration information. In the (2) new program notification, for example, the server 70 determines whether there is any necessity of new program update, and if so, sends a notification of new program update to the vehicle 20. Upon receiving the notification, the vehicle 20 notifies a user of the necessity of the new program update by, for example, displaying notice and obtains a consent by the user for the new program update. This notice may be performed by using an interface equipped with the vehicle 20 or the mobile terminal 30. In the (3) downloading, for example, the vehicle 20 sends a request for the new program. In response, the server 70 causes the vehicle 20 to download and save the new program into a memory device equipped with the vehicle 20. By using the downloaded and saved program, the vehicle 20 overwrites a double bank memory in the (4) double bank memory overwrite. The steps of the (1) configuration synchronization, the (2) new program notification, the (3) downloading, and the (4) double bank memory overwrite are all performed during the IG power supply is on state.

When the IG power supply becomes off, in the (5) single bank memory overwrite, the vehicle 20 informs the user of down time for program update by, for example, displaying information and obtains a consent by the user for the new program update. Then, the vehicle 20 performs the single bank memory overwrite. This may be initiated at the timing scheduled by a user in advance. In the (6) activation, the vehicle 20 activates the updated program.

When the IG power supply becomes on, the vehicle 20 notifies the user of the completion of the program update and obtains confirmation by the user in the (7) program update confirmation. Also, the vehicle 20 sends configuration information including new program which is now being executed.

For example, the vehicle 20 may be a vehicle with an internal combustion engine, an electric vehicle such as a Battery Electric Vehicle (BEV), a Hybrid Electric Vehicle (HEV), a Plug-in Hybrid Electric Vehicle (PHEV), an Extended Range Electric Vehicle (EREV). The event in which the IG power supply becomes on is an example of the event that the mobile object is powered on. In another example, the mobile object may be powered on by pressing a brake pedal of the mobile object. In yet another example, the mobile object may be powered on by receiving an instruction from the mobile terminal 30.

The update of the ECU by reprogramming the ECU is executed by the control system 200 during drive of the vehicle 20 is disabled such as IG is turned off. Therefore, the required electric power for the program update is supplied by a low-voltage battery. Also, because the vehicle 20 cannot be used during the processing of the program update, execution of the program update may be scheduled at any convenient time when a user does not drive the vehicle 20. For example, a user may specify a starting time for the execution of the program update by inputting it on HMI device.

According to study by the inventor, it may possibly occur that the user forgets the scheduled program update time and performs maintenance on the vehicle 20 at the time in which the program update is scheduled. As a result, it may be possible that the low-voltage battery is disconnected and removed from the vehicle 20 for maintenance purpose in the middle of the program update. Especially, when the user uses an auto repair service for maintenance, a maintenance person has no knowledge about the scheduled program update, and thus, it may be possible that the maintenance person disconnects the battery or removes the battery from the vehicle 20 for providing service. Loss of power in the middle of the program update may cause a problem with the program update, and thus, it is desirable to prevent the battery from being disconnected from the vehicle 20 during the program update.

For example, when it is detected that a hood of a storage compartment which stores a battery is opened during performing the program update, a specific notice is provided to a user. According to this configuration, it is possible to prevent the user from disconnecting the battery during performing the rewriting control.

Figure 3:
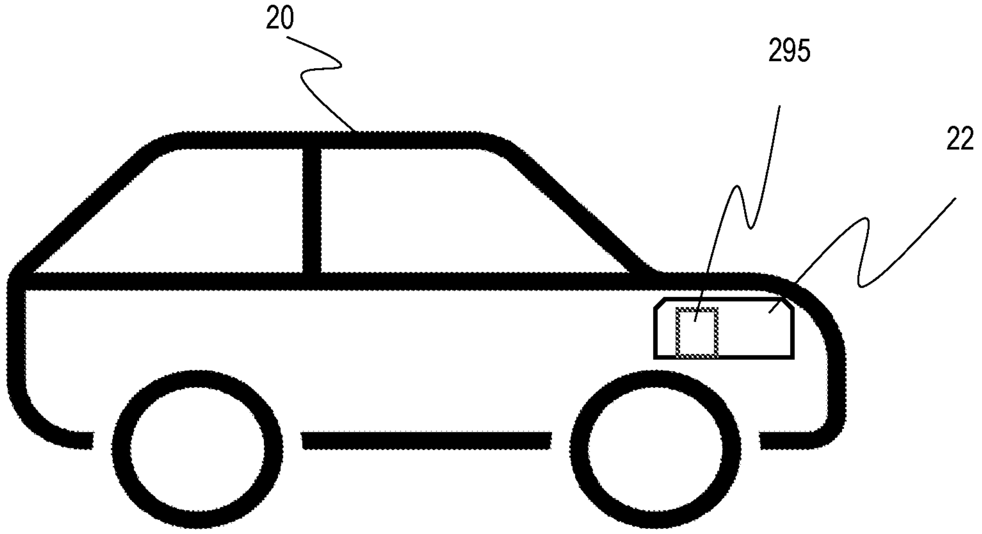
FIG. 3 schematically shows an embodiment of configuration of a battery.
Figure 4:
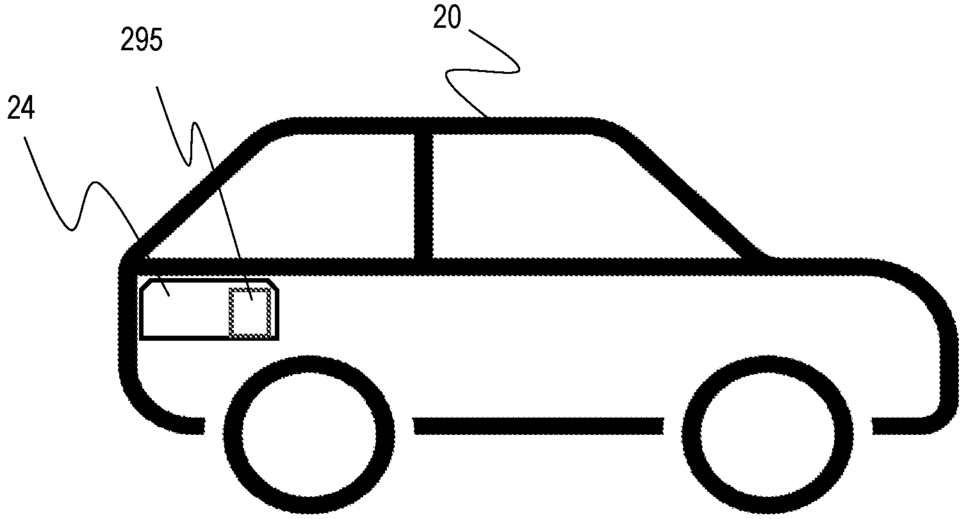
FIG. 4 schematically shows another embodiment of configuration of a battery.

The control system 200 which performs the program update is supplied electric power from a low-voltage battery such as 12V lead-acid battery. FIG. 3 schematically shows an embodiment of configuration of a battery. FIG. 4 schematically shows another embodiment of configuration of a battery. For example, as shown by FIG. 3, the vehicle 20 includes a storage compartment 22 covered by a hood. The storage compartment 22 is a frunk which is located at a front portion of the vehicle 20. A low-voltage battery 295 is stored in the storage compartment 22. The low-voltage battery 295 is connected to the control system 200 via a cable and/or a bus. The embodiment is not limited to the above configuration. For example, as shown by FIG. 4, the vehicle 20 may alternatively or additionally include a storage compartment 24 covered by a hood. The storage compartment 24 is a trunk which is located at a rear portion of the vehicle 20. The configuration of the battery is not limited to the above embodiments. The low-voltage battery 295 may be stored in a storage compartment provided to any portion of the vehicle 20.

FIG. 5 schematically shows a system configuration provided to the control system 200. The vehicle control system 200 includes a central ECU 2 which performs general control of the vehicle 20 and information processing. The central ECU 2 is connected with communication lines including communication wires B1 to B6. The central ECU 2 realizes a function of a gateway which manages delivery and acceptance of communication data among those communication lines. The central ECU 2 executes writing of programs to be executed by the ECUs for the ECUs which are connected with the central ECU 2 by the communication wires B1 to B6 and for the ECUs which are connected with the above ECUs by other communication wires B7 to B14. Writing of a program includes update of a program which is already written in the ECU and newly writing a program in the ECU. The central ECU 2 executes over-the-air (OTA) management, for example. The OTA management includes control about a process of downloading an update program for the ECU included in the vehicle 20 from a server on the outside of the vehicle and about a process of applying a downloaded update program to an in-vehicle device, for example.

The ECU 2 is configured to function as a program update control apparatus (also referred to as 'OTA manager') configured to control the program update of the ECUs 50. The ECU 2 includes a rewriting control unit 220, an acquisition unit 240, and a storage unit 270.

The rewriting control unit 220 is configured to perform control of rewriting a program, which is executed by the ECUs 50, to a new program. The acquisition unit 240 is configured to acquire a new program from the server 70 and save the downloaded program to the storage unit 270.

The vehicle control unit includes a zone-A ECU 11, a zone-B ECU 13, and the ECUs 50 illustrated in FIG. 5, for example. In FIG. 5, each of various ECUs which are connected with the central ECU 2, the zone-A ECU 11, and the zone-B ECU 13 is denoted as ECU 50. With the central ECU 2, the zone-A ECU 11 is connected by the communication wire B1, and the zone-B ECU 13 is connected by the communication wire B2. As described later, in addition, plural ECUs 50 are connected with the zone-A ECU 11 and the zone-B ECU 13. The zone-A ECU 11 manages delivery and acceptance of communication data between the central ECU 2 and the ECUs 50 which are connected with the zone-A ECU 11. The zone-B ECU 13 manages delivery and acceptance of communication data between the central ECU 2 and the ECUs 50 which are connected with the zone-B ECU 13.

With the central ECU 2, plural ECUs 50 are connected by the communication wires B4, B5, and B6. Those ECUs 50 include a vehicle-to-everything (V2X) communication device, for example. The V2X communication device is a communication device that includes a communication antenna and a communication circuit, which are not illustrated, and that has a wireless communication function and performs vehicle-to-vehicle communication or road-to-vehicle communication in accordance with control by the central ECU 2. The ECUs 50 which are connected with the central ECU 2 may include a telematics control unit (TCU). The TCU is a wireless communication device that includes a communication antenna and a communication circuit, which are not illustrated, and that executes wireless data communication by a cellular communication system such as long-term evolution (LTE) or the fifth-generation mobile communication system (5G). The ECUs 50 which are connected with the central ECU 2 may include an in-vehicle infotainment (IVI) ECU. With the IVI-ECU, in-vehicle apparatuses such as an automotive navigation system, various cameras including a rear camera, an audio player, a monitor, a touch panel, operation elements such as keys and switches, a speaker, and a microphone are connected. The IVI-ECU controls the in-vehicle apparatuses and thereby provides various kinds of information and entertainment for an occupant of the vehicle 20. For example, the IVI-ECU executes control such as starts and stops of the in-vehicle apparatuses, control for outputting data and so forth, which are detected by a sensor by the other ECU, and so forth. The IVI-ECU may also control HMI device of the vehicle 20. The V2X communication device and the TCU are one example of a function unit which is controlled by the central ECU 2.

The ECUs 50 which are connected with the central ECU 2 may include a driving assistance ECU which executes control for automatically parking the vehicle 20 at a parking position or an assistance function in a case where a driver parks the vehicle 20. Function units as control targets of the driving assistance ECU include various cameras, a monitor, a touch panel, a steering device, a brake mechanism, and an acceleration device, which are installed in the vehicle 20, for example.

With the zone-A ECU 11, plural ECUs 50 are connected by the communication wires B7 to B10. The ECUs 50 which are connected with the zone-A ECU 11 include a fuel injection (FI) control unit, a motor control unit, a battery (BATT) control unit, a shift control unit, a vehicle stability assist (VSA) control unit, and so forth, for example. The ECUs 50 which are connected with the zone-A ECU 11 by the communication wires B7 to B10 can be considered to be function units as control targets of the zone-A ECU 11.

The FI control unit controls a fuel injection amount and a fuel injection timing in an internal combustion engine which is installed in the vehicle 20. Function units as control targets of the FI control unit include an electronic control fuel injection device and may include sensors. As sensors, an O2 sensor, a knock sensor, a cam angle sensor, a crank angle sensor, an intake air temperature sensor, an exhaust gas temperature sensor, and so forth can be raised. The motor control unit controls a rotation speed of a motor which is installed in the vehicle 20. Function units as control targets of the motor control unit include an inverter circuit which supplies a driving current to the motor and may include various sensors.

The BATT control unit performs charge control, discharge control, and management of a remaining charge amount for a traveling battery which is installed in the vehicle 20. A battery as a function unit as a control target of the BATT control unit is a battery that is separately provided from a starting battery such as the low-voltage battery 295 which supplies power to each unit of the vehicle control system 200 and is installed in the vehicle 20 for supplying a driving power source for the motor. The traveling battery may be a lithium-ion secondary battery, a lithium polymer battery, a nickel-metal hydride battery, a solid-state battery, another secondary battery, or a capacitor. Function units as control targets of the BATT control unit may include a regenerative mechanism which generates regenerative power by traveling energy of the vehicle 20. Meanwhile, the starting battery of the vehicle 20 is a secondary battery which supplies power to each unit of the vehicle control system 200 in a state where a power source of the vehicle 20 is turned off and is charged by a generating device installed in the vehicle 20 during travel of the vehicle 20. For example, the starting battery is formed from a lead-acid battery, another secondary battery, or a capacitor.

The shift control unit controls a shift mechanism of the vehicle 20 in accordance with a traveling state of the vehicle 20 and an operation by the driver. Function units as control targets of the shift control unit include the shift mechanism of the vehicle 20, and specifically, a step automatic transmission (AT), a continuously variable transmission (CVT), a dual clutch transmission (DCT), or the like is raised. The function units as the control targets of the shift control unit may include a shift position sensor, a shift switch, a shift lever, and so forth.

A function unit as a control target of the VSA control unit is an actuator provided to a brake mechanism of the vehicle 20, for example. The VSA control unit causes the actuator of the brake mechanism to act in accordance with a posture or the like of the vehicle 20 and thereby stabilizes the posture of the traveling vehicle 20, and in advance prevents a slip and a spin, for example.

With the zone-B ECU 13, plural ECUs 50 are connected by the communication wires B11 to B14. The ECUs 50 which are connected with the zone-B ECU 13 includes a light control unit and a horn control unit, for example. The ECUs 50 which are connected with the zone-B ECU 13 by the communication wires B11 to B14 can be considered to be function units as control targets of the zone-B ECU 13.

Function units as control targets of the light control unit are lamp bodies which are installed in the vehicle 20, that is, lighting devices 297. For example, the control targets of the light control unit include headlights, direction indicators, fog lamps, brake lights, and reversing lights. The light control unit may control a lamp body, which illuminates an inside of a vehicle cabin of the vehicle 20, as a control target. A function unit as a control target of the horn control unit is a horn device 296 which performs beeping of the vehicle 20.

A hood open sensor 298 may be connected to the central ECU 2 by the communication wire B3. The hood open sensor 298 detects that the hood of the vehicle 20 is opened and/or the hood of the vehicle 20 is in an open status. Also, the hood open sensor 298 may be connected to one of the ECU 50 as a control target.

The communication wires B1 to B14 are formed from plural communication transmission paths which conform to various communication standards. Each of the communication wires B1 to B14 can be provided as a data transmission path which conforms to a different communication standard. That is, a specific configuration, a transmission band, and a communication standard of a cable that constitutes each of the communication wires B1 to B14 are arbitrarily selected. As communication standards which are applicable to the communication wires B1 to B14, for example, a controller area network (CAN), Ethernet®, a universal serial bus (USB), a local interconnect network (LIN), and a low-voltage differential signaling (LVDS) can be raised, but other standards may be used. The communication wires B1 to B6 are illustrated, in FIG. 5, as independent communication lines, but their specific configurations are not restricted, and for example, the communication wires B1 to B6 may be bus communication lines, which are connected with plural apparatuses, similarly to the communication wires B7 to B14.

The above description explains examples of various ECUs 50 which are installed in the vehicle 20 and apparatuses which are controlled by the ECUs 50. It is not intended that the ECUs 50 included in the vehicle 20 as an application target of the present disclosure are limited to a manner of connection illustrated in FIG. 5.

Figure 6:
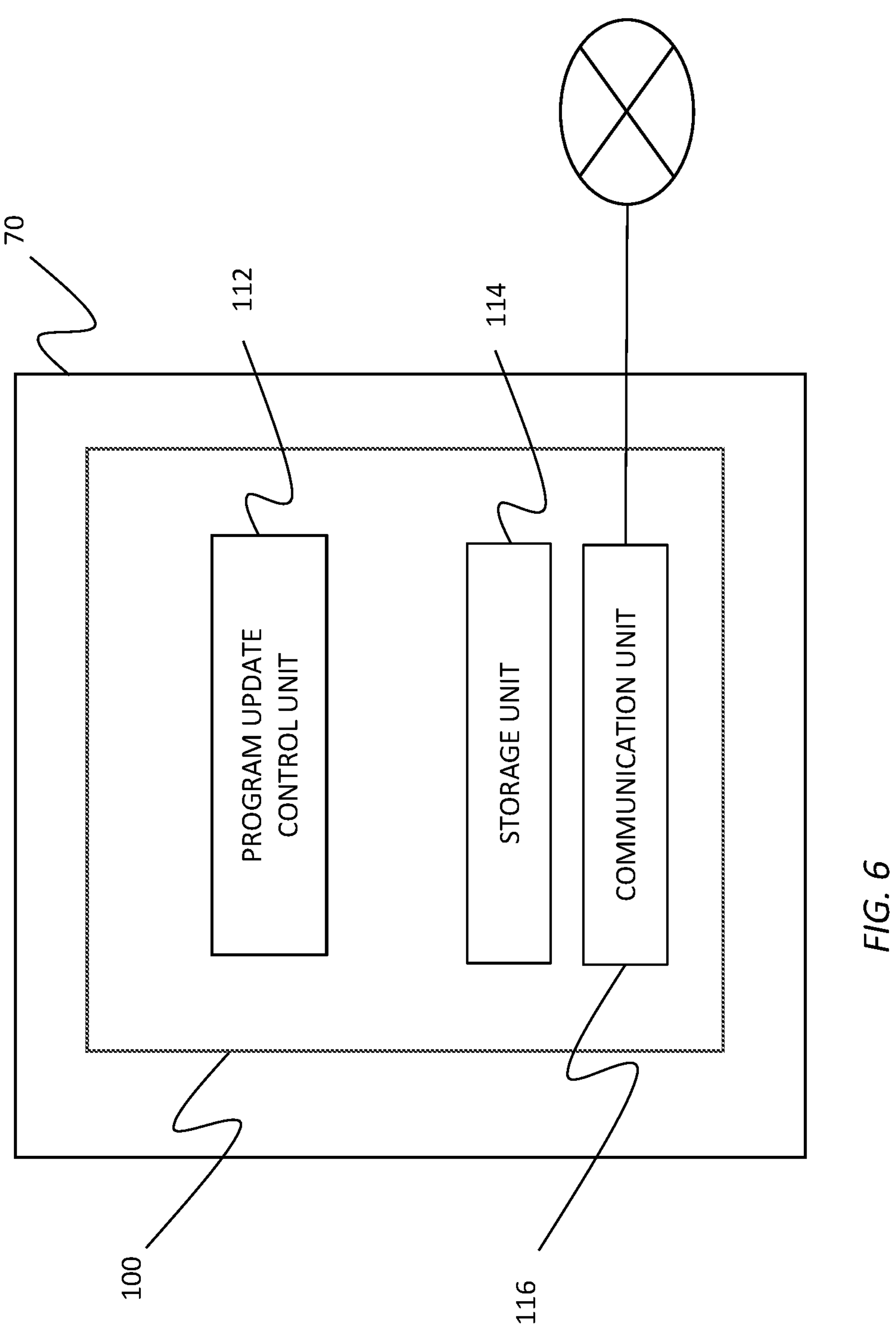
FIG. 6 schematically shows a configuration of the server 70.

FIG. 6 schematically shows a configuration of the server 70. The server 70 includes a control system 100. The control system 100 is responsible for control of the server 70 and communication with the vehicle 20 and the mobile terminal 30 via the communication network such as a mobile communication network through the communication unit 116 such as a network card. The control system 100 includes a program update control unit 112 and a storage unit 114.

The program update control unit 112 maintains current version of program for each vehicle registered in the server 70 by timely updating a program for each ECU. The program update control unit 112 sends and receives information and data to and from the vehicle 20 and the mobile terminal 30 through the communication unit 116, and save and maintain data stored in the storage unit 114.

Figure 7:
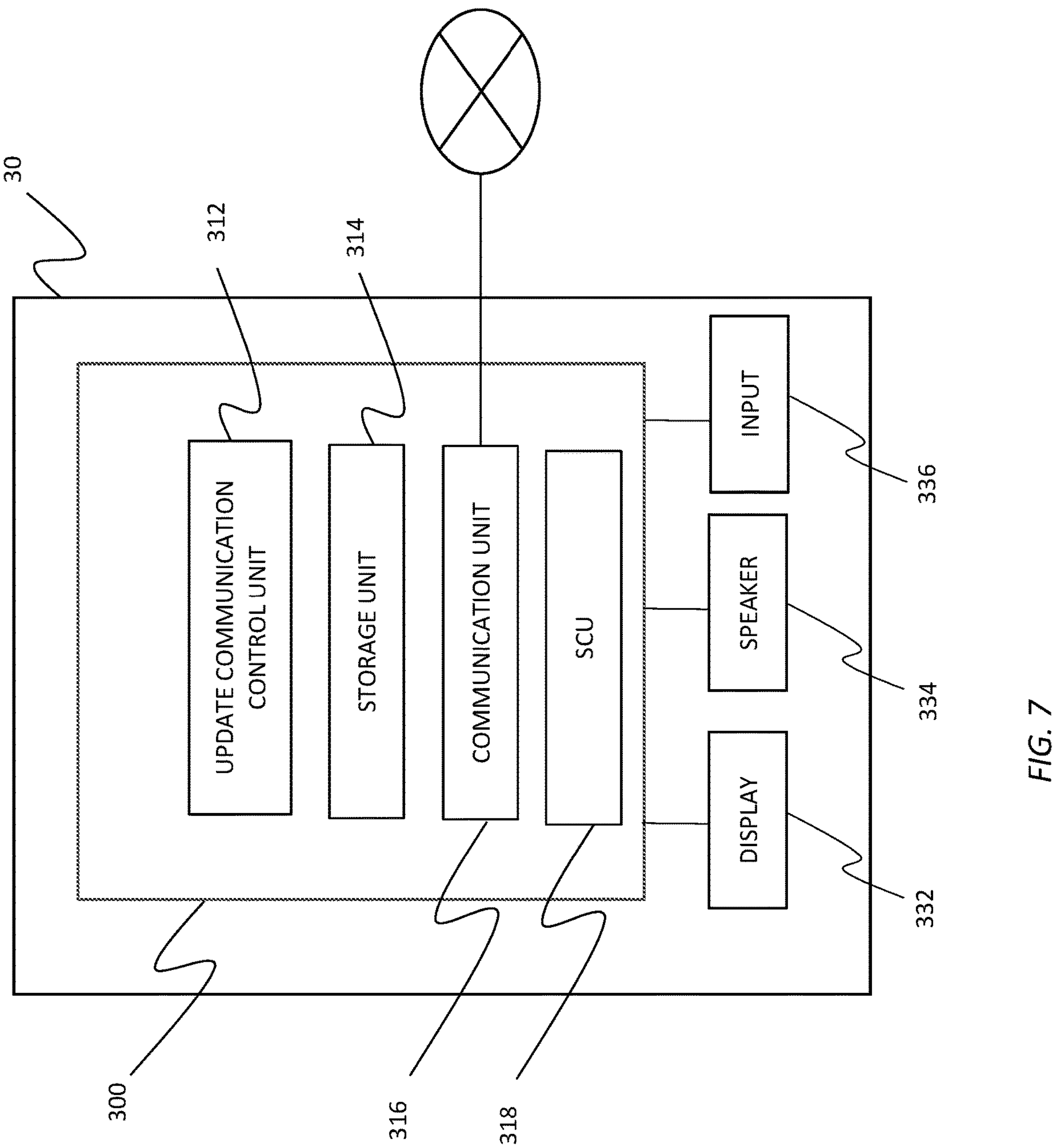
FIG. 7 schematically shows a configuration of the mobile terminal 30.

FIG. 7 schematically shows a configuration of the mobile terminal 30. The mobile terminal 30 includes a control system 300. The control system 300 is responsible for control of the mobile terminal 300 and communication with the server 70 via the communication network such as a mobile communication network through the communication unit 316 such as a network card. The control system 300 may be also communication with the vehicle 20 through the short range communication unit (SCU) 318 via short range communication such as Bluetooth®, Wi-Fi®, NearLink, near-field communication (NFC), LPWAN, ultra-wideband (UWB). The control system 300 includes an update communication control unit 312 and a storage unit 314. The control system 300 also controls an output device of the mobile terminal 30 such as a display device 332 and a speaker 334 to output information, and also control an input device 336 such as a keyboard and a touch panel to receive input information from a user.

When a new version of a program is released, the program update control unit 112 of the server 70 stores it and identifies a vehicle which is subject to update. In many cases, the program update is directed to a specific model, a specific year, a specific trim or a specific region and so on. The program update control unit 112 assigns a unique identification "UPDATE ID" or "CAMPAIGN ID" to the program update, identifies all vehicles subject to the program update, and save the data with the correlation therebetween. When the subject vehicle is identified, the program update control unit 112 communicates with the vehicle 20 which is subject to the update and causes the vehicle 20 to download and save the new program thereon to update the program by rewriting the program for an ECU. Before starting the download, the program update control unit 112 may obtain an approval for the download from a user of the subject vehicle. For example, the program update control unit 112 sends information such as version information and detailed feature or improvement of the new program to the vehicle 20. The rewriting control unit 220 displays version information and detailed feature or improvement of the new program on the IVI and/or HMI, and prompts approval by a user. The program update control unit 112 may also send the information such as version information and detailed feature or improvement of the new program to the mobile terminal 30. The update communication control unit 312 displays version information and detailed feature or improvement of the new program on the display device 332, prompts approval by a user to be input via the input device 336.

Figure 8:
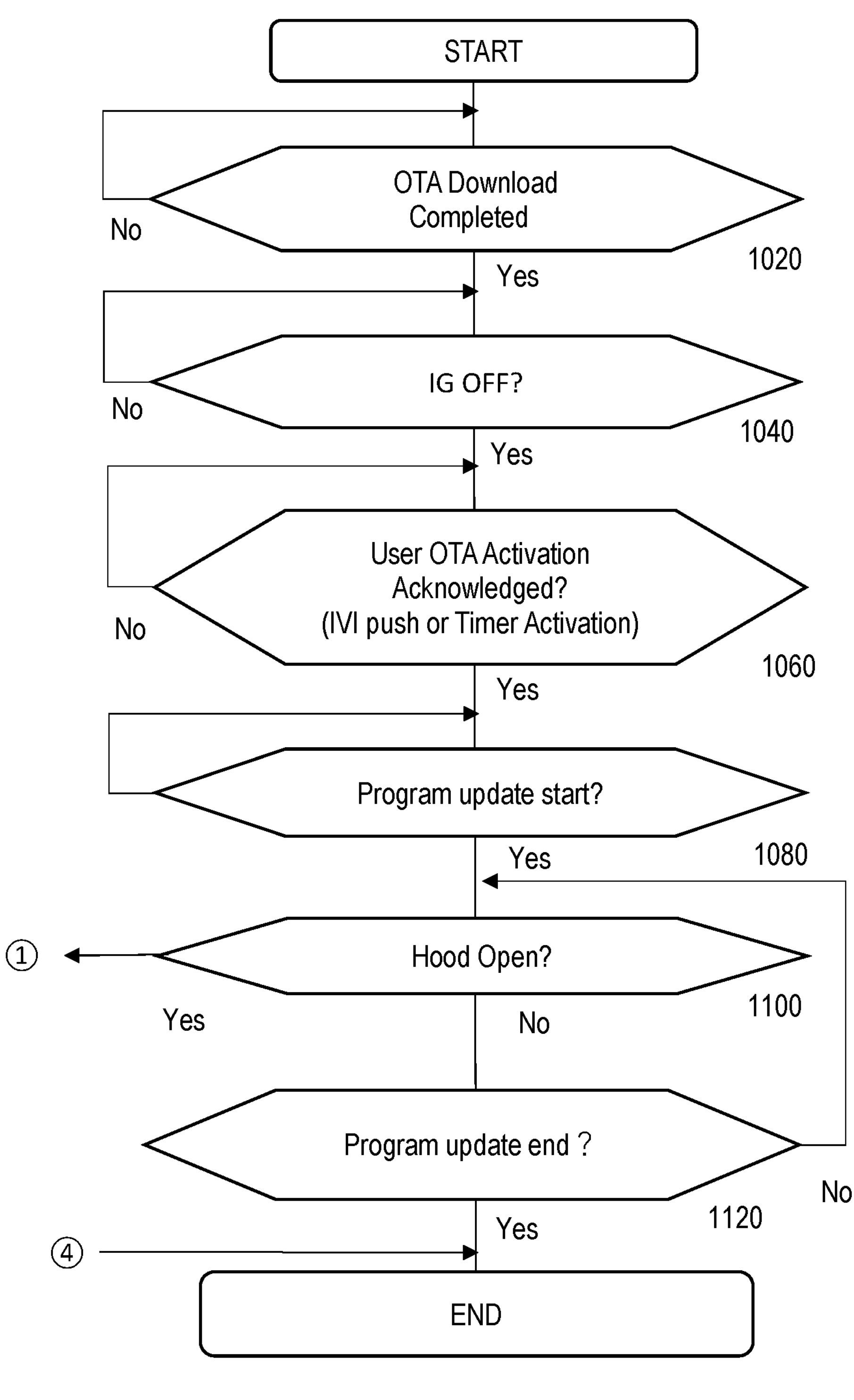
FIG. 8 shows a processing of a program update method of a mobile object according to one embodiment of the present application.
Figure 10:
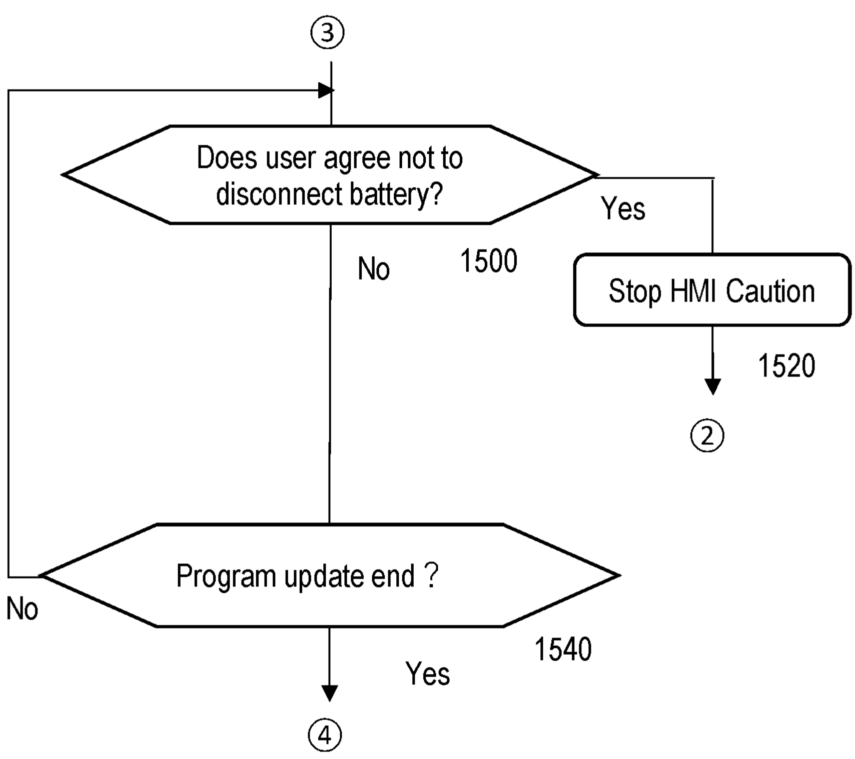
FIG. 10 shows a processing of a program update method of a mobile object according to one embodiment of the present application.

Now, a processing of a program update method of a mobile object according to one embodiment of the present application is described. FIG. 8 to FIG. 10 show a processing of a program update method of a mobile object according to one embodiment of the present application. At step 1020, the rewriting control unit 220 determines whether a new program has been downloaded by the acquisition unit 240 from the server 70 to the storage unit 270. When the answer is negative, the process goes to loop. On the other hand, when the answer is affirmative, the rewriting control unit 220 determines whether the vehicle 20 is turned in a disabled state at step 1040. For example, the vehicle 20 is turned in a disabled state when ignition IG is turned off. In other embodiment, the vehicle 20 may be disabled when the vehicle 20 is turned off by other mechanism. When the answer is negative, the process goes to loop. On the other hand, when the answer is affirmative, the rewriting control unit 220 notifies a user on a display device such as IVI and/or HMI of the vehicle 20 that a new program is ready for update and prompts user acceptance for execution of the program update or scheduling of initiation of the program update at step 1060.

Figure 11:
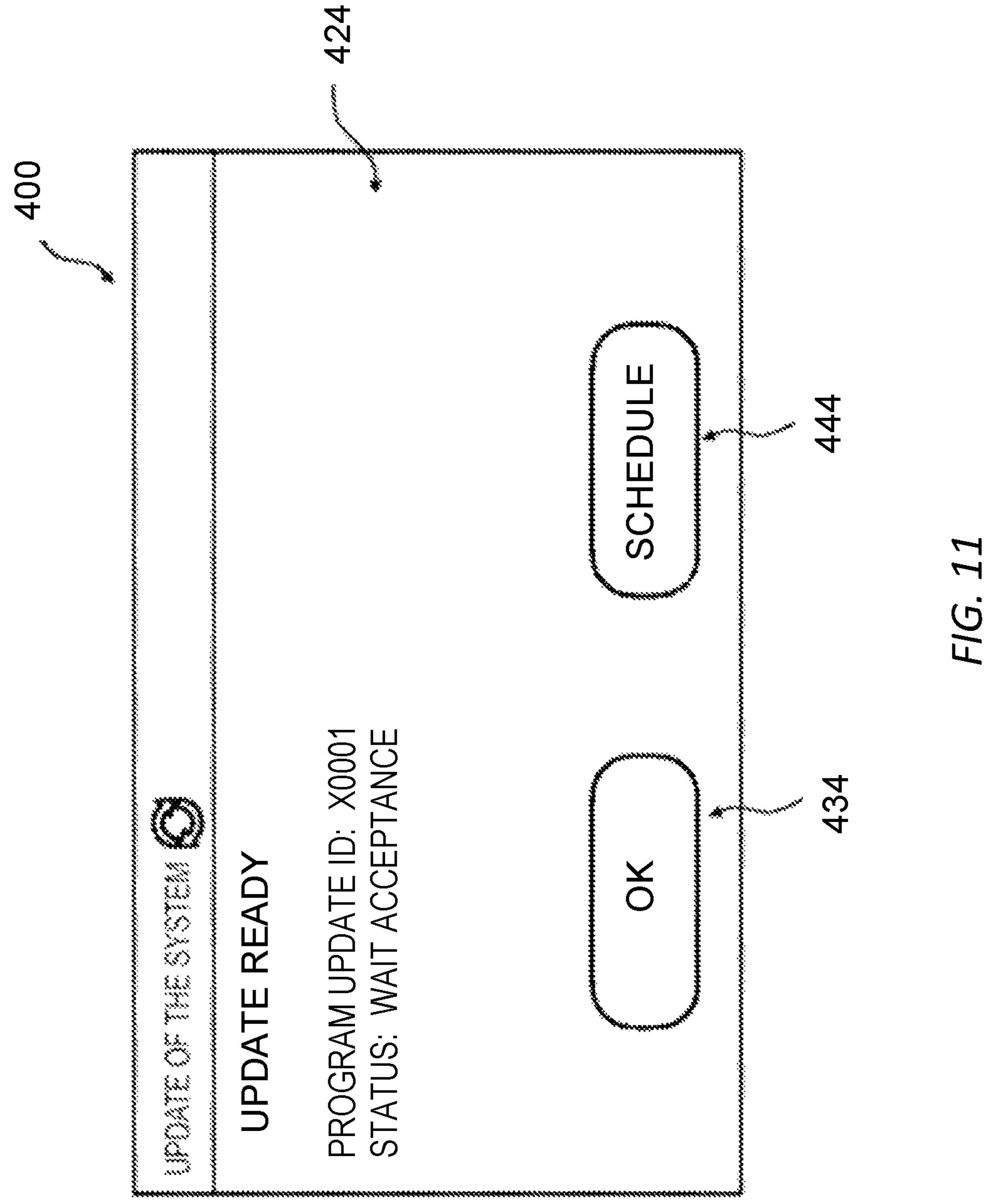
FIG. 11 shows an example of update ready notice screen 400.

FIG. 11 shows an example of update ready notice screen 400. For example, the rewriting control unit 220 may display on the IVI and/or HMI the update ready notice screen 400. The update ready notice screen 400 includes a status section 424, an acceptance button 434 and a schedule button 444. The status section 424 indicates that a user is prompted to accept the program update. By selecting the acceptance button 434, the user can accept the program update. In this event, the rewriting control unit 220 may initiate the execution of the program update after a predetermined amount of time such as tens of seconds has passed. By selecting the schedule button 444, the user can designate a specific time and date when the program update should start. Alternatively or additionally, the rewriting control unit 220 may display on the display device 332 of the mobile terminal 300 the update ready notice screen 400.

At step 1060, the rewriting control unit 220 determines whether the user has accepted the program update or the user has set up the scheduled time for starting the program update. When the answer is negative, the process goes to loop. On the other hand, when the answer is affirmative, the rewriting control unit 220 determines whether the rewriting has started at step 1080. For example, the rewriting control unit 220 determines whether the predetermined amount of time has passed after the acceptance, or the scheduled time has come. Here, by starting the program update, rewriting the program of the electronic control unit is started. In a single bank memory, the memory is overwritten. In a double bank memory, the memory with older program is switched by the memory with newer program.

When the answer is negative, the process goes to loop. On the other hand, when the answer is affirmative, the rewriting control unit 220 determines whether the hood is opened during performing the rewriting control based on the detection signal from the hood open sensor 298 at step 1100. When the answer is negative, the rewriting control unit 220 determines whether program update ends or not at step 1120. For example, program update ends by completing the program update. Also, program update may end by failing the program update. When the answer is negative, the process loops until the program update ends. On the other hand, when the answer is affirmative, the process ends.

When the answer is affirmative at step 1100, that is, the hood is opened during performing the rewriting control, as shown by FIG. 9, the rewriting control unit 220 provides a first notice on the IVI and/or HMI to a user by cautioning "not to disconnect the low-voltage battery" at step 1200.

Figure 12:
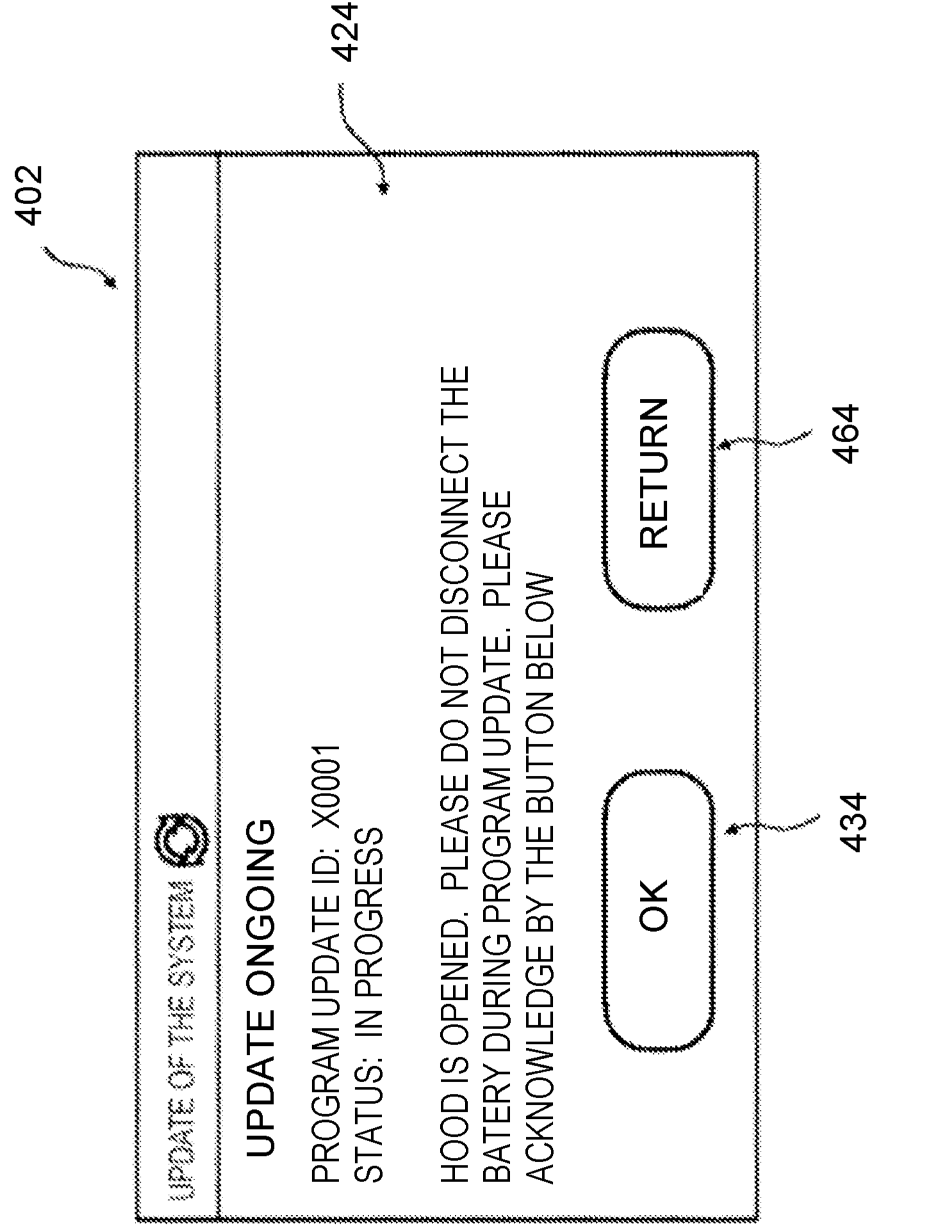
FIG. 12 shows an example of warning screen 402.

FIG. 12 shows an example of warning screen 402. For example, the rewriting control unit 220 may display on the IVI and/or HMI the warning screen 402. The warning screen 402 includes a status section 424, an acceptance button 434 and a return button 464. The status section 424 indicates that the program update is in progress and the battery should not be disconnected or removed during performing the rewriting control. A user is prompted to accept "not disconnect the low-voltage battery." By selecting the acceptance button 434, the user accepts not to disconnect the low-voltage battery. This is determined by the rewriting control unit 220 (as described later).

Next, the rewriting control unit 220 determines whether program update ends or not at step 1220. For example, program update ends by completing the program update. Also, program update may end by failing the program update. When the answer is affirmative, the process ends.

On the other hand, when the answer is negative, the rewriting control unit 220 determines whether the user accepts not to disconnect the low-voltage battery by selecting the acceptance button 434 at step 1240. When the answer is affirmative, the rewriting control unit 220 ceases the first notice on the IVI and/or HMI at step 1400. Then, the rewriting control unit 220 determines whether program update ends or not at step 1420. When the answer is affirmative, the process ends. On the other hand, when the answer is negative, the process loops until the program update ends.

On the other hand, when the answer is negative at step 1240, the rewriting control unit 220 determines whether the hood is closed after providing the notice at step 1260. When the answer is affirmative, the process moves to step 1500 (FIG. 10). At step 1500, the rewriting control unit 220 determines whether the user accepts not to disconnect the low-voltage battery by selecting the acceptance button 434. When the answer is affirmative, the rewriting control unit 220 ceases the first notice on the IVI and/or HMI at step 1520. Then, the rewriting control unit 220 determines whether program update ends or not at step 1420. When the answer is affirmative, the process ends. On the other hand, when the answer is negative at step 1500, the process goes to loop.

On the other hand, when the answer is negative at step 1260, that is, the hood is not closed, the rewriting control unit 220 determines whether a predetermined amount of time has passed after providing the first notice at step 1280. When the answer is negative, the process goes to loop. When the answer is affirmative, the rewriting control unit 220 provides a second notice by beeping by the horn 296 and/or flashing by the lighting device 297 at step 1300.

Then, the rewriting control unit 220 determines whether program update ends or not at step 1320. For example, program update ends by completing the program update. Also, program update may end by failing the program update. When the answer is affirmative, the process ends.

On the other hand, when the answer is negative, the rewriting control unit 220 determines whether the user accepts not to disconnect the low-voltage battery by selecting the acceptance button 434 at step 1340. When the answer is affirmative, the rewriting control unit 220 ceases all of the notices, that is, the first notice on the IVI and/or HMI and the second notice (beeping by the horn 296 and/or flashing by the lighting device 297) at step 1440. Then, the rewriting control unit 220 determines whether program update ends or not at step 1420. When the answer is affirmative, the process ends. On the other hand, when the answer is negative, the process loops until the program update ends.

On the other hand, when the answer is negative at step 1340, the rewriting control unit 220 determines whether the hood is closed after providing the second notice at step 1360. When the answer is negative, the process goes to loop. On the other hand, when the answer is affirmative at step 1360 the rewriting control unit 220 ceases the second notice at step 1380.

Then, the process moves to step 1500 (FIG. 10). At step 1500, the rewriting control unit 220 determines whether the user accepts not to disconnect the low-voltage battery by selecting the acceptance button 434. When the answer is affirmative, the rewriting control unit 220 ceases the first notice on the IVI and/or HMI at step 1520. Then, the rewriting control unit 220 determines whether program update ends or not at step 1420. When the answer is affirmative, the process ends. On the other hand, when the answer is negative at step 1500, the process goes to loop.

According to the embodiment, when it is detected that a hood of a storage compartment which stores a low-voltage battery is opened during performing the rewriting control, a warning or caution (first notice) that the battery should not be disconnected or removed during performing the rewriting control is provided to a user. Thus, it is possible to prevent the user from disconnecting the battery during performing the rewriting control.

Moreover, the warning or cautions may be displayed on the display device equipped with the vehicle 20. To open the hood, the user operates a hood open switch or lever located inside a cabin of the vehicle 20. Thus, it is possible to display the warning or caution when the hood open switch or lever is operated to open the hood. This may facilitate that the user recognizes the warning or caution immediately when the hood open switch or lever is operated before leaving the vehicle 20.

According to the embodiment, the user may accept not to disconnect the low-voltage battery by selecting the acceptance button 434. Then, when the user agrees not to disconnect the low-voltage battery, the rewriting control unit 220 ceases the notice. Thus, it facilitates that the user can access vehicle parts equipped in the storage compartment or things stored in the storage compartment while effectively preventing disconnection of the low-voltage battery. For example, it becomes possible to perform vehicle oil change or pick up a grocery bag during performing the rewriting control.

According to the embodiment, the rewriting control unit 220 may provide a warning or caution by beeping by the horn 296 and/or flashing by the lighting device 297. Thus, it becomes possible to effectively provide a second notice to someone who is present outside of the vehicle 20 and who has difficulty to look at the display device inside the vehicle 20. For example, it becomes possible to effectively provide the notice to someone who is performing maintenance service such as vehicle oil change outside the vehicle 20.

The second notice may be alternative to the first notice. The second notice may be additional to the first notice. In the latter, the second notice may be provided after a predetermined amount of time has passed after providing the first notice. The second notice (beeping and/or flashing) would have a larger impact on environment. By this embodiment, it is possible to avoid excessive warning.

According to the embodiment, when the hood is closed after providing the first or second notice, the rewriting control unit 220 may cease the notice. By this embodiment, it is possible to improve the usability.

According to the embodiment, when the hood is closed after providing the second notice, the second notice is ceased, but the first notice remains until the user accepts not to disconnect the low-voltage battery by selecting the acceptance button 434. By this embodiment, it is possible to ascertain that the user understands that the rewriting control is performed and the battery should not be disconnected or removed during performing the rewriting control before ceasing the first notice.

Second Embodiment

Figure 14:
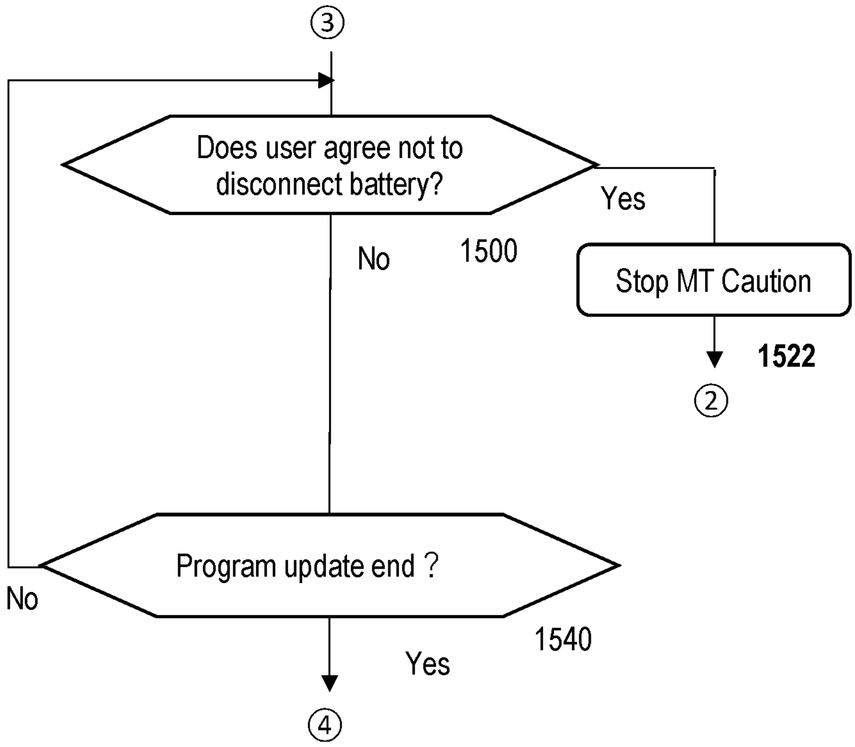
FIG. 14 shows a processing of a program update method of a mobile object according to another embodiment of the present application.

Now, the second embodiment is described below. In the embodiment described above, the display device, the horn 296 and/or the lighting device 297 equipped with the vehicle 20 are used to provide the notice. In the second embodiment, the display device 332 and the speaker 334 of the mobile terminal 300 may be used alternative to or additionally. FIG. 13 and FIG. 14 show a processing of a program update method of a mobile object according to another embodiment of the present application. In the description below, processing steps which are different from the previous embodiment are described.

As shown by FIG. 13, when it is detected that the hood is opened at step 1100, the rewriting control unit 220 provides a first notice on the display device 332 of the mobile terminal 30 to a user at step 1202. For example, the rewriting control unit 220 may display on the display device 332 the warning screen 402. The communication between the rewriting control unit 220 and the control system 300 of the mobile terminal 30 may be performed via the short range communication or via the mobile communication network through the server 70. When the user selects the acceptance button 434, the user accepts not to disconnect the low-voltage battery. This is determined by the rewriting control unit 220 at step 1242, and then, the rewriting control unit 220 ceases the first notice on the display device 332 at step 1402.

When the rewriting control unit 220 determines that a predetermined amount of time has passed after providing the first notice at step 1280, as shown by FIG. 13, the rewriting control unit 220 provides a second notice by beeping by the speaker 334 of the mobile terminal 30 at step 1302.

Then, the rewriting control unit 220 determines whether the user accepts not to disconnect the low-voltage battery by selecting the acceptance button 434 at step 1342. When the answer is affirmative, the rewriting control unit 220 ceases the first notice and the second notice at step 1442.

The rewriting control unit 220 also determines whether the hood is closed after providing the notice at step 1360. When the answer is affirmative, the rewriting control unit 220 ceases the second notice at step 1382.

Then, as shown by FIG. 14, the rewriting control unit 220 determines whether the user accepts not to disconnect the low-voltage battery by selecting the acceptance button 434 at step 1500. When the answer is affirmative, the rewriting control unit 220 ceases the first notice at step 1522.

By this embodiment, the first notice (warning or caution) may be displayed on the display device equipped with the mobile terminal 30. Thus, it is possible to facilitate that the user recognizes the warning or caution. To open the hood, some vehicle allow the user to send a hood open command from the mobile terminal 30. Thus, it is possible to display the warning or caution when the hood open command is sent from the mobile terminal 30. This may facilitate that the user recognizes the warning or caution immediately when the hood open command is sent from the mobile terminal 30 before leaving the mobile terminal 30.

Figure 15:
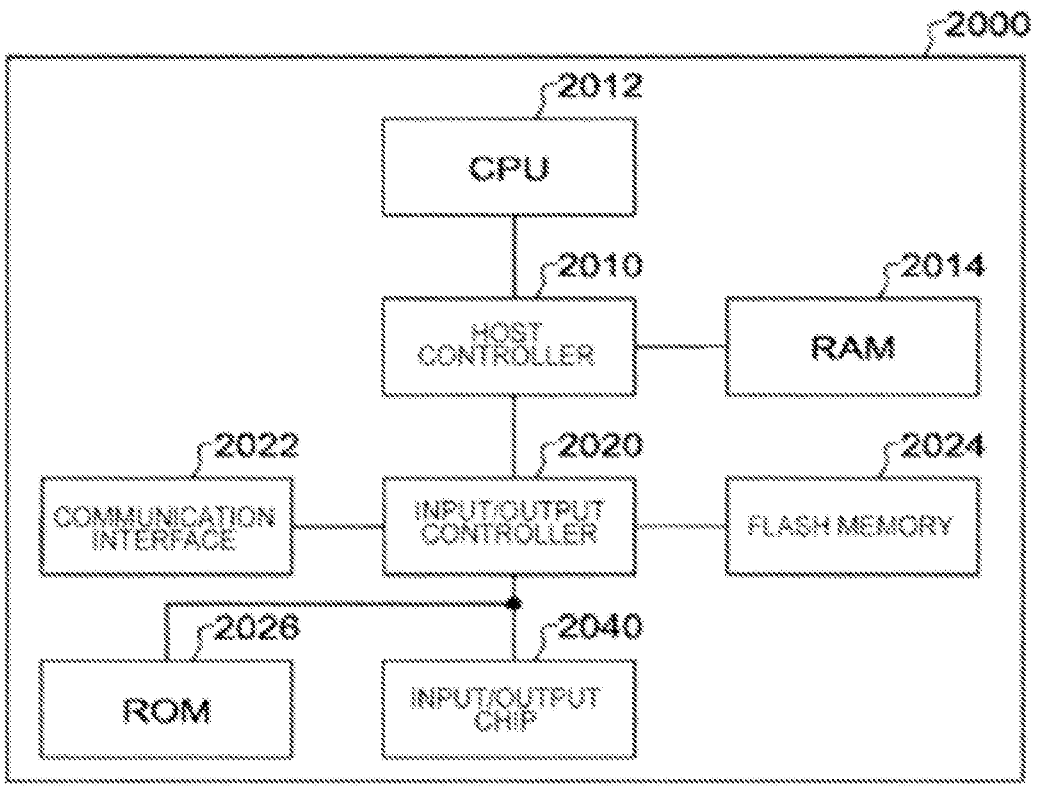
FIG. 15 shows an example of a computer 2000 where a plurality of embodiments of the present disclosure may be entirely or partially embodied.

FIG. 15 shows an example of a computer 2000 where a plurality of embodiments of the present disclosure may be entirely or partially embodied. A program that is installed in the computer 2000 can cause the computer 2000 to function as a system such as the control system of the embodiment or each unit of the system or as an apparatus such as an information processing apparatus or each unit of the apparatus, to execute operations associated with the system or each unit of the system or the apparatus or each unit of the apparatus, and/or to execute the process of the embodiment or steps thereof. Such a program may be executed by a CPU 2012 so as to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input and output chip 2040. The ROM 2026, the flash memory 2024, the communication interface 2022, and the input and output chip 2040 are connected to the host controller 2010 via an input and output controller 2020.

The CPU 2012 is configured to operate according to programs stored in the ROM 2026 and the RAM 2014, thereby controlling each unit.

The communication interface 2022 is configured to communicate with other electronic devices via a network. The flash memory 2024 is configured to store a program and data that are used by the CPU 2012 in the computer 2000. The ROM 2026 is configured to store a boot program or the like that is executed by the computer 2000 at boot-up, and/or a program depending on hardware of the computer 2000. The input and output chip 2040 may also be configured to connect various input and output units such as a keyboard, a mouse, and a monitor, to the input and output controller 2020 via input and output ports such as a serial port, a parallel port, a keyboard port, a mouse port, a monitor port, a universal serial bus (USB) port and a high-definition multimedia interface (HDMI (registered trademark)) port.

A program is provided via a computer-readable storage medium such as a CD-ROM, a DVD-ROM, or a memory card, or a network. The RAM 2014, the ROM 2026, or the flash memory 2024 is an example of the computer-readable storage medium. The program is installed in the flash memory 2024, the RAM 2014 or the ROM 2026 and is executed by the CPU 2012. Information processing described in these programs is read into the computer 2000, resulting in cooperation between the programs and the various types of hardware resources described above. An apparatus or a method may be constituted by realizing an operation or processing of information according to a use of the computer 2000.

For example, when communication is performed between the computer 2000 and an external device, the CPU 2012 may be configured to execute a communication program loaded onto the RAM 2014 to instruct communication processing to the communication interface 2022, based on processing described in the communication program. The communication interface 2022 is configured, under control of the CPU 2012, to read transmission data stored on a transmission buffer processing area provided in a recording medium such as the RAM 2014 and the flash memory 2024, to transmit the read transmission data to the network, and to write reception data received from the network to a reception buffer processing area or the like provided on the recording medium.

In addition, the CPU 2012 may be configured to cause all or a necessary portion of a file or a database, which has been stored in a recording medium such as the flash memory 2024, to be read into the RAM 2014, thereby executing various types of processing on the data on the RAM 2014. Next, the CPU 2012 is configured to write the processed data back to the recording medium.

Various types of information, such as various types of programs, data, tables, and databases, may be stored in the recording medium and may be subjected to information processing. The CPU 2012 may be configured to execute, on the data read from the RAM 2014, various types of processing including various types of operations, processing of information, conditional judgment, conditional branching, unconditional branching, search and replacement of information, and the like described in the present specification and specified by instruction sequences of the programs, and to write a result back to the RAM 2014. The CPU 2012 may also be configured to search for information in a file, a database, etc., in the recording medium. For example, when a plurality of entries, each having an attribute value of a first attribute associated with an attribute value of a second attribute, is stored in the recording medium, the CPU 2012 may be configured to search for an entry having a designated attribute value of the first attribute that matches a condition from the plurality of entries, and to read the attribute value of the second attribute stored in the entry, thereby obtaining the attribute value of the second attribute associated with the first attribute that satisfies a predetermined condition.

The programs or software modules described above may be stored in a computer-readable storage medium on or near the computer 2000. A recording medium such as a hard disk or a RAM provided in a server system connected to a dedicated communication network or the Internet can be used as a computer-readable storage medium. The program stored in the computer-readable storage medium may be provided to the computer 2000 via the network.

A program that is installed in the computer 2000 and causes the computer 2000 to function as the control system 200 may work on the CPU 2012 and the like to cause the computer 2000 to function as each unit of the control system 200, respectively. Information processing described in these programs are read into the computer 2000 to cause the computer to function as each unit of the control system 200, which is a specific means realized by cooperation of software and the various types of hardware resources described above. Then, with these specific means, by realizing computing or processing of information according to an intended use of the computer 2000 in the present embodiment, the specific control system 200 is constructed according to the intended use.

Similarly, a program that is installed in the computer 2000 and causes the computer 2000 to function as the control system 100 may work on the CPU 2012 and the like to cause the computer 2000 to function as each unit of the control system 100, respectively. Information processing described in these programs are read into the computer 2000 to cause the computer to function as each unit of the control system 100, which is a specific means realized by cooperation of software and the various types of hardware resources described above. Then, with these specific means, by realizing computing or processing of information according to an intended use of the computer 2000 in the present embodiment, the specific control system 100 is constructed according to the intended use.

Similarly, a program that is installed in the computer 2000 and causes the computer 2000 to function as the control system 300 may work on the CPU 2012 and the like to cause the computer 2000 to function as each unit of the control system 300, respectively. Information processing described in these programs are read into the computer 2000 to cause the computer to function as each unit of the control system 300, which is a specific means realized by cooperation of software and the various types of hardware resources described above. Then, with these specific means, by realizing computing or processing of information according to an intended use of the computer 2000 in the present embodiment, the specific control system 300 is constructed according to the intended use.

Various embodiments have been described with reference to the block diagrams and the like. In the block diagrams, each block may represent (1) a step of a process in which an operation is executed, or (2) each unit of an apparatus having a role in executing the operation. Certain steps and each unit may be implemented by dedicated circuitry, programmable circuitry supplied with computer-readable instructions stored on computer-readable storage media, and/or processors supplied with computer-readable instructions stored on computer-readable storage media. The dedicated circuitry may include a digital and/or analog hardware circuit, or may include an integrated circuit (IC) and/or a discrete circuit. The programmable circuitry may include a reconfigurable hardware circuit including logical AND, logical OR, logical XOR, logical NAND, logical NOR, and other logical operations, a memory element such as a flip-flop, a register, a field programmable gate array (FPGA) and a programmable logic array (PLA), and the like.

Computer-readable storage media may include any tangible device that can store instructions to be executed by a suitable device, and as a result, the computer-readable storage medium having the instructions stored thereon constitutes at least a part of an article of manufacture including instructions that can be executed to provide means for performing operations specified in the processing procedures or block diagrams. Examples of the computer-readable storage media may include an electronic storage medium, a magnetic storage medium, an optical storage medium, an electromagnetic storage medium, a semiconductor storage medium, and the like. More specific examples of the computer-readable storage media may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code described in any combination of one or more programming languages, including an object oriented programming language such as Smalltalk (registered trademark), JAVA (registered trademark) and C++, and a conventional procedural programming language such as a 'C' programming language or similar programming languages.

Computer-readable instructions may be provided to a processor of a general purpose computer, a special purpose computer, or other programmable data processing apparatus, or to programmable circuitry, locally or via a local area network (LAN), wide area network (WAN) such as the Internet, etc., and the computer-readable instructions may be executed to provide means for performing operations specified in the described processing procedures or block diagrams. Examples of processors include computer processors, processing units, microprocessors, digital signal processors, controllers, microcontrollers, and the like.

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications. In the accompanying claims, a processor is not limited to a single processor, a processor may be implemented by one or more processor. Also, multiple processes or functions may be implemented by a single processor.

The operations, procedures, steps, stages and the like of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer implemented method updating a program of an electronic control unit equipped with a mobile object, wherein the mobile object comprises:

a rewriting control processor performing a rewriting control of rewriting a program of the electronic control unit;

a storage compartment covered by a hood; and a battery stored in the storage compartment and configured to supply electrical power to the rewriting control processor and the electronic control unit, the method comprising:

acquiring new program from an external apparatus via a network; and performing the rewriting control of rewriting the program of the electronic control unit, the rewriting being performed by using the acquired new program during drive of the mobile object is disabled;

detecting whether the hood is opened during performing the rewriting control; and when it is detected that the hood is opened during performing the rewriting control, continuing the performing of the rewriting control of rewriting the program of the electronic control unit, and providing a notice to a user, wherein the notice includes a first notice that indicates on a display device equipped with the mobile object that the battery should not be disconnected or removed during performing the rewriting control.

2. The method according to claim 1, further comprising:

determining whether the user acknowledges the first notice or not, and when it is determined that the user acknowledges the first notice, ceasing the first notice on the display device.

3. The method according to claim 1, wherein the notice includes at least a second notice that is a notice by performing a beeping or a flashing by the mobile object.

4. The method according to claim 1, wherein the notice includes a second notice that is a notice by performing a beeping or a flashing by the mobile object, and wherein the method further comprises:

determining whether a predetermined amount of time has passed or not after providing the first notice, and when it is determined that the predetermined amount of time has passed after providing the first notice, providing the second notice.

5. The method according to claim 4, further comprising:

determining whether the hood is closed after providing the second notice, and when it is determined that the hood is closed after providing the second notice, stopping providing the second notice and maintaining the first notice.

6. The method according to claim 1, wherein the notice includes a third notice that indicates on a display device equipped with a mobile terminal of the user that the battery should not be removed during performing the rewriting control, the method further comprises detecting whether a hood open command has been sent from the mobile terminal during performing the rewriting control, and when it is detected that the hood open command has been sent from the mobile terminal during performing the rewriting control, providing the third notice to the mobile terminal.

7. The method according to claim 6, further comprising: disabling a command function in the mobile terminal that sends a hood open command from the mobile terminal to the mobile object during performing the rewriting control.

8. The method according to claim 1, wherein the storage compartment is a frunk located at a front portion of the mobile object or a trunk located at a rear portion of the mobile object.

9. A mobile object comprising:

an acquisition processor acquiring new program from an external apparatus via a network;

a rewriting control processor performing a rewriting control of rewriting a program of an electronic control unit equipped with the mobile object, the rewriting being performed by using the acquired new program during drive of the mobile object is disabled;

a storage compartment covered by a hood; and a battery stored in the storage compartment and configured to supply electrical power to the rewriting control processor and the electronic control unit, wherein the rewriting control processor:

detects whether the hood is opened during performing the rewriting control, and when it is detected that the hood is opened during performing the rewriting control, continues the performing of the rewriting control of rewriting the program of the electronic control unit, and provides a notice to a user, wherein the notice includes a first notice that indicates on a display device equipped with the mobile object that the battery should not be disconnected or removed during performing the rewriting control.

10. The mobile object according to claim 9, wherein the rewriting control processor:

determines whether the user acknowledges the first notice or not, and when it is determined that the user acknowledges the first notice, ceases the first notice on the display device.

11. The mobile object according to claim 9, wherein the notice includes at least a second notice that is a notice by performing a beeping or a flashing by the mobile object.

12. The mobile object according to claim 9, wherein the notice includes a second notice that is a notice by performing a beeping or a flashing by the mobile object, and the rewriting control processor:

determines whether a predetermined amount of time has passed or not after providing the first notice, and when it is determined that the predetermined amount of time has passed after providing the first notice, provides the second notice.

13. The mobile object according to claim 12, the rewriting control processor:

determines whether the hood is closed after providing the second notice, and when it is determined that the hood is closed after providing the second notice, stops providing the second notice and maintains the first notice.

14. A program update system comprising:

a server device;

a mobile object; and a mobile terminal, wherein the mobile object comprises:

an acquisition processor acquiring new program from the server deice via a network, and a rewriting control processor performing a rewriting control of rewriting a program of an electronic control unit equipped with the mobile object, the rewriting being performed by using the acquired new program during drive of the mobile object is disabled;

a storage compartment covered by a hood; and a battery stored in the storage compartment and configured to supply electrical power to the rewriting control processor and the electronic control unit, wherein the rewriting control processor:

detects whether the hood is opened during performing the rewriting control, and when it is detected that the hood is opened during performing the rewriting control, continues the performing of the rewriting control of rewriting the program of the electronic control unit, and provides a notice to a user, wherein the notice includes a first notice that indicates on a display device equipped with the mobile terminal that the battery should not be disconnected or removed during performing the rewriting control.

15. The program update system according to claim 14, wherein the rewriting control processor:

determines whether the user acknowledges the first notice or not, and when it is determined that the user acknowledges the first notice, ceases the first notice on the display device.

16. The program update system according to claim 14, wherein the notice includes at least a second notice that is a notice by performing a beeping by the mobile terminal.

17. The program update system according to claim 14, wherein the notice includes a second notice that is a notice by performing a beeping by the mobile terminal, and the rewriting control processor:

determines whether a predetermined amount of time has passed or not after providing the first notice, and when it is determined that the predetermined amount of time has passed after providing the first notice, provides the second notice.

* * * * *